(12) United States Patent
Osicki et al.

(10) Patent No.: US 8,413,972 B2
(45) Date of Patent: Apr. 9, 2013

(54) MULTIPLE AXIS POSITIONER

(75) Inventors: David Osicki, Painsville, OH (US); Erin Spier, North Olmsted, OH (US); Mike Brant, Richmond Heights, OH (US)

(73) Assignee: Lincoln Global, Inc., City of Industry, CA (US)

( * ) Notice: Subject to any disclaimer, the term of this patent is extended or adjusted under 35 U.S.C. 154(b) by 689 days.

(21) Appl. No.: 12/575,579

(22) Filed: Oct. 8, 2009

(65) Prior Publication Data
US 2011/0084434 A1    Apr. 14, 2011

(51) Int. Cl.
*B23Q 1/64* (2006.01)
(52) U.S. Cl. ............... 269/57; 269/60; 269/329; 269/55
(58) Field of Classification Search ..... 74/813 R–813 L; 269/45, 271, 95, 57, 61, 71, 55, 60, 329
See application file for complete search history.

(56) References Cited

U.S. PATENT DOCUMENTS

| | | | | |
|---|---|---|---|---|
| 2,549,083 A * | 4/1951 | Hamilton | ........................ | 108/21 |
| 2,953,949 A * | 9/1960 | Witzig et al. | ................... | 408/44 |
| 3,468,074 A * | 9/1969 | Eddy | ............................. | 451/398 |
| 3,518,899 A * | 7/1970 | Greenberg et al. | ............. | 74/816 |
| 3,615,068 A * | 10/1971 | Edelstein | ................... | 248/349.1 |
| 3,666,161 A | 5/1972 | Keller | | |
| 3,764,127 A * | 10/1973 | Keller | .......................... | 269/287 |
| 3,799,007 A | 3/1974 | Keller | | |
| 4,062,437 A * | 12/1977 | Knapp | ....................... | 198/346.2 |
| 4,520,595 A * | 6/1985 | Diener | ........................... | 451/28 |
| 4,655,652 A * | 4/1987 | Schissler | ....................... | 409/132 |
| 5,072,651 A | 12/1991 | Kagita | | |
| 5,240,746 A | 8/1993 | O'Connell Litteral | | |
| 5,370,745 A | 12/1994 | Litteral | | |
| 5,429,345 A * | 7/1995 | Yang | ............................... | 269/71 |
| 5,542,317 A * | 8/1996 | Carter et al. | ................. | 74/813 L |
| 5,720,088 A * | 2/1998 | Riello et al. | .................. | 29/38 B |
| 5,784,932 A * | 7/1998 | Gilberti | ....................... | 74/813 R |
| 5,950,503 A * | 9/1999 | Amendolea | ................. | 74/813 R |
| 6,244,928 B1 * | 6/2001 | Hiramoto | .......................... | 451/5 |
| 6,716,146 B2 * | 4/2004 | Kato | ............................... | 483/58 |
| 6,865,788 B2 * | 3/2005 | Pasquetto | ..................... | 29/38 B |
| 6,907,318 B2 * | 6/2005 | Passmore et al. | ................. | 700/245 |
| 6,964,215 B2 * | 11/2005 | Thomson et al. | ........... | 74/813 R |
| 7,275,460 B2 * | 10/2007 | Gunter | ........................ | 74/813 R |

(Continued)

FOREIGN PATENT DOCUMENTS
WO    2009078308    6/2009

OTHER PUBLICATIONS

Camco Model #601 RDM Xpress Info sheet. http://www.camcoindex.com/xpress.htm.*

(Continued)

*Primary Examiner* — Lee D. Wilson
*Assistant Examiner* — Tyrone V Hall, Jr.
(74) *Attorney, Agent, or Firm* — Pearne & Gordon LLP

(57) ABSTRACT

An embodiment of a multiple axis positioner comprises a main headstock that has a main hollow bore. A main indexing table is attached to the main headstock. The main indexing table has a through-hole near the its center. The through-hole aligns or is substantially coaxial with the main hollow bore of the main headstock. The embodiment of the multiple axis positioner further includes at least three minor headstocks mounted to the main indexing table. The at least three minor headstocks have minor hollow bores.

8 Claims, 5 Drawing Sheets

U.S. PATENT DOCUMENTS

| | | | |
|---|---|---|---|
| 2007/0116392 A1* | 5/2007 | Ishikawa et al. | 384/445 |
| 2007/0283860 A1* | 12/2007 | Sun | 108/94 |
| 2009/0102109 A1* | 4/2009 | Nuchter et al. | 269/71 |
| 2010/0225035 A1* | 9/2010 | Gerber et al. | 269/55 |

OTHER PUBLICATIONS

"Motor" definition. http://www.hyperdictionary.com/search.aspx?define=motor.*

* cited by examiner

MULTIPLE AXIS POSITIONER

FIELD OF INVENTION

The present application relates to a positioner for an arc welding system. More particularly, the present application relates to a multiple axis positioner.

BACKGROUND

A workpiece positioner requires an operator to load and unload the workpiece on to the positioner or on to a fixture attached to the positioner. In some cases, a workpiece may require more than one operation, thus requiring multiple instances of loading and unloading the workpiece. Some operations may require various cables, hoses, and so on to be brought in the direction of the workpiece.

SUMMARY

An embodiment of a multiple axis positioner comprises a main headstock that has a main hollow bore. A main indexing table is attached to the main headstock. The main indexing table has a through-hole near the its center. The through-hole aligns or is substantially coaxial with the main hollow bore of the main headstock. The embodiment of the multiple axis positioner further includes at least three minor headstocks mounted to the main indexing table. The at least three minor headstocks have minor hollow bores.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. The drawings are not to scale and the proportion of certain elements may be exaggerated for the purpose of illustration.

DETAILED DESCRIPTION

Figure 1:
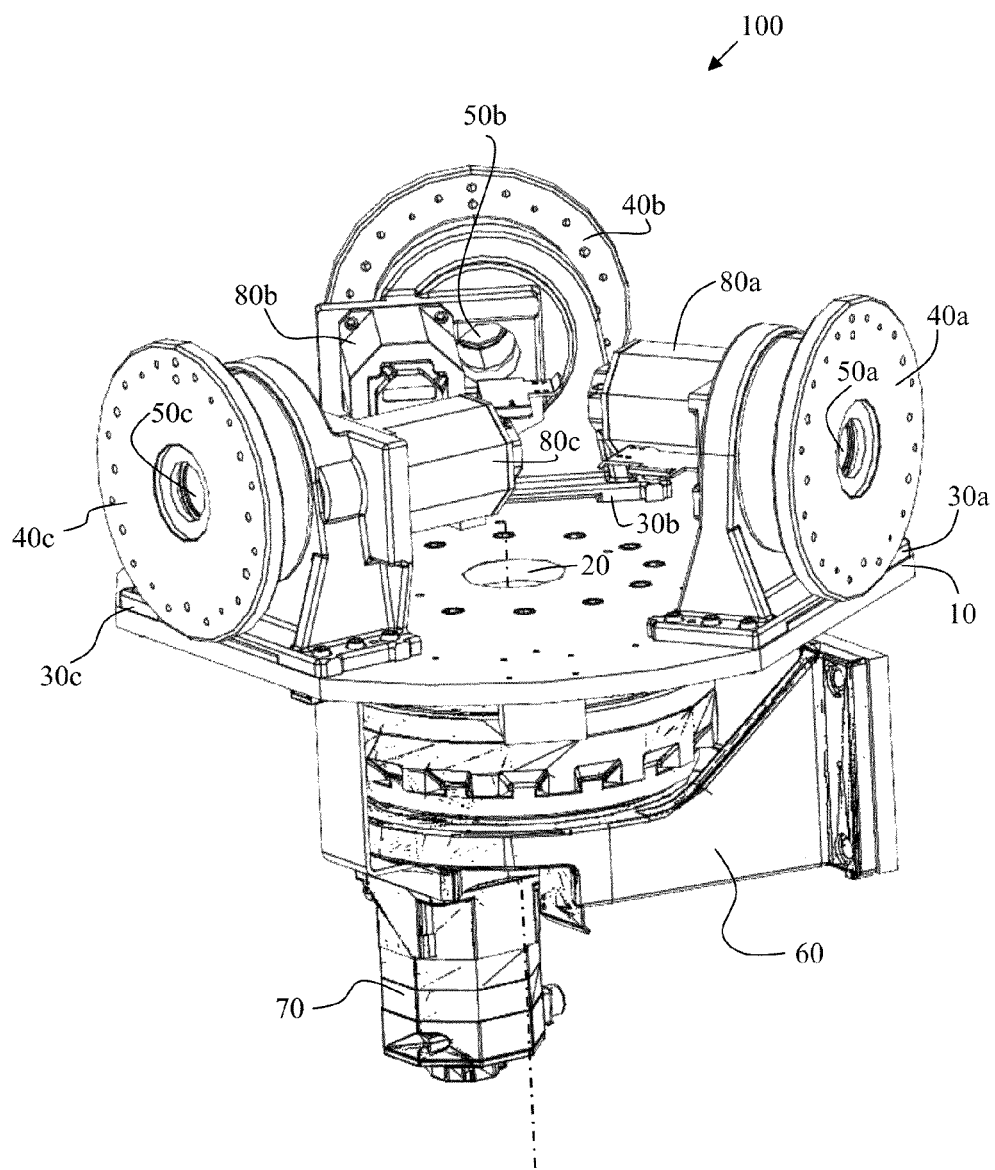
FIG. 1 illustrates a perspective view of one embodiment of a multiple axis positioner.
Figure 2:
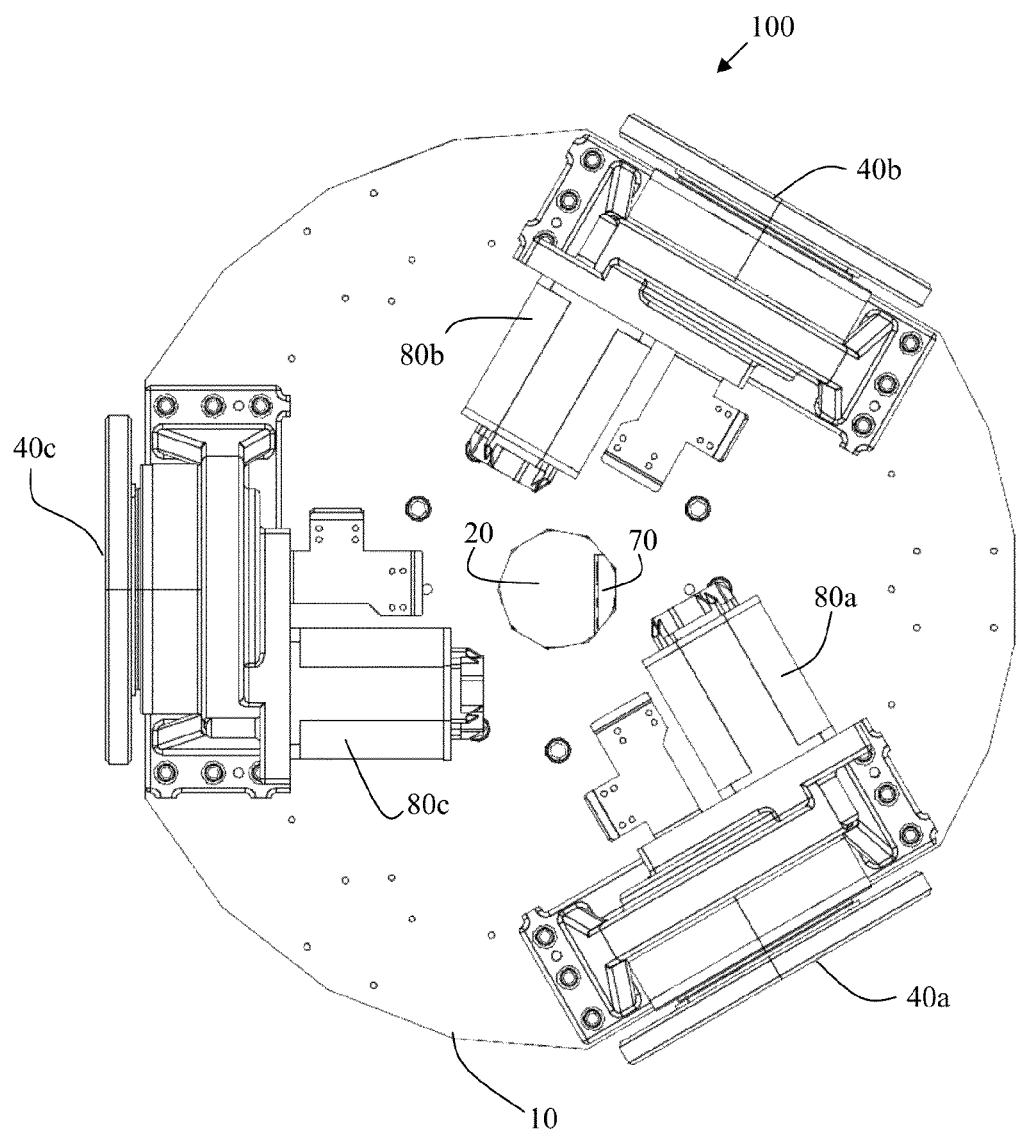
FIG. 2 illustrates a top view of one embodiment of a multiple axis positioner.

FIGS. 1 and 2, illustrate a perspective view and a top view, respectively, of an embodiment of a multiple axis positioner 100. In the illustrated embodiment, the positioner 100 is a multistation apparatus that may be used as a holder for workpieces during various operations (e.g. welding, hard facing, and so on).

In the illustrated embodiment, the positioner 100 includes a main or primary rotary table 10. Primary rotary table 10 includes a surface that forms a through-hole 20 located at the center of the rotary table 10. The positioner 100 may also include bases 30a-c that are operatively connected to the rotary table 10. The minor or secondary rotary tables 40a-c are operatively connected to the bases 30a-c. In the illustrated embodiment, each of the minor rotary tables 40a-c includes a center surface forming a through hole 50a-c located substantially at the center of each minor rotary table 40a-c. Although three minor rotary tables 40a-c are shown, the positioner 100 may include more or less than three minor rotary tables.

In the illustrated embodiment, the positioner 100 includes a primary base 60. The primary base 60 is configured to support the positioner 100 via a connection to a wall. In alternative embodiments, the base 10 may support the positioner 100 via a connection to a floor, workstation walls, a ceiling, and so on. In the embodiment, the primary rotary table 10 is operatively connected to the primary base 60.

In the illustrated embodiment, the positioner 100 includes a primary motor 70 operatively connected to the primary rotary table 10. The primary motor 70 rotates the primary rotary table 10. As best seen in FIG. 2, the primary motor 70 is located at an off-center position in reference to the primary through-hole 20 such that the primary through-hole 20 is substantially unobstructed by the primary motor 70.

In the illustrated embodiment, the positioner 100 also includes three secondary motors 80a-c. Each of the secondary motors 80a-c is operatively connected to one of the minor rotary tables 40a-c. Each of the secondary motors 80a-c rotates one of the minor rotary tables 40a-c. Each of the secondary motors 80a-c is located at an off-center position in reference to its associated secondary through-hole 50a-c such that the secondary through-holes 50a-c are unobstructed by the secondary motors 80a-c. The location of the secondary motors 80a-c in reference to the secondary through-holes 50a-c may be best appreciated looking at the location of secondary motor 80b in reference to secondary through-hole 50b in FIG. 1.

In one embodiment (not shown), cables, hoses, ground cables, and so on may be routed through the primary and secondary through-holes. Such cables, hoses, or ground cables may be connected to a fixture or workpiece, or used in operations performed on the workpiece.

Figure 3:
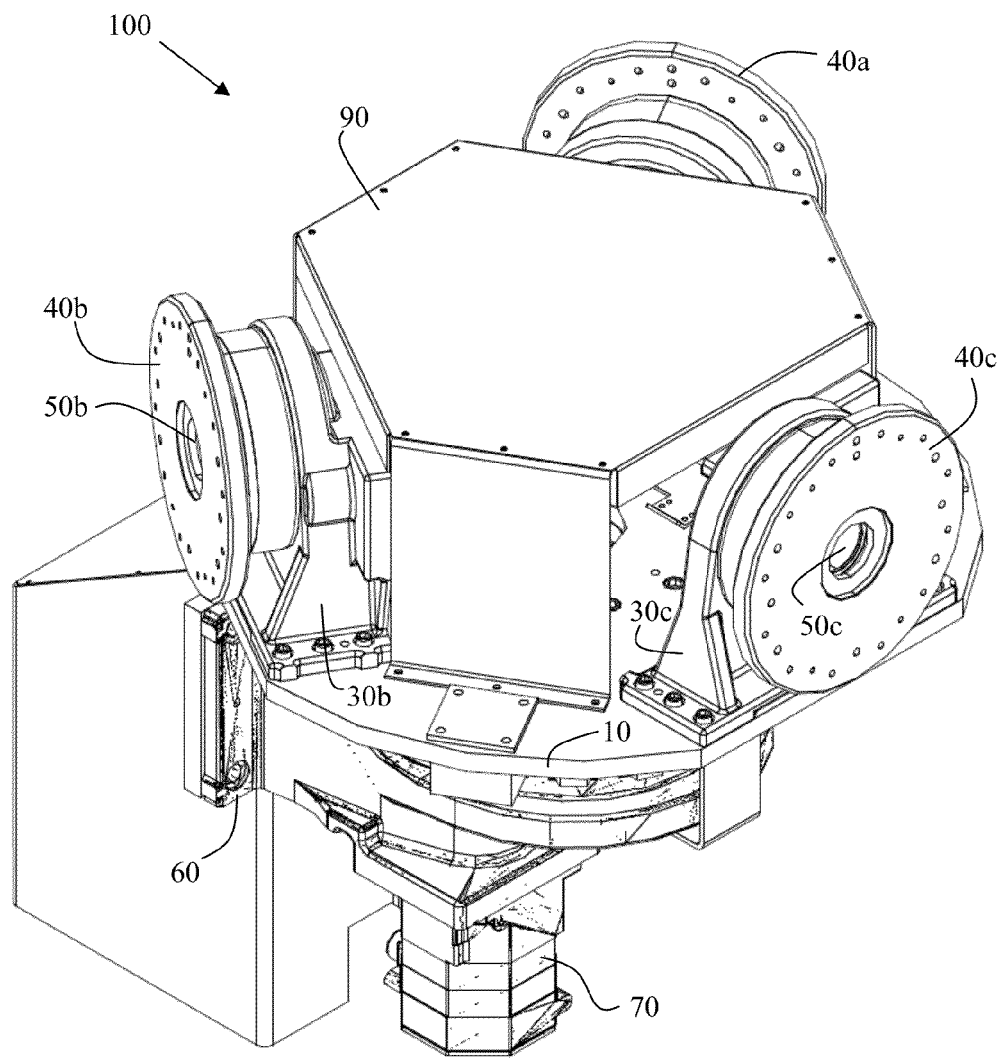
FIG. 3 illustrates a perspective view of the one embodiment of the multiple axis positioner including a top shield.

In reference to FIG. 3, the positioner 100 may include a protective enclosure or top shield 90 operatively connected to the primary rotary table 10. The top shield 90 may provide protection to cables, hoses, instrumentation, and so on that may be routed through the primary through-hole 20 and the secondary through-holes 50a-c.

Figure 4:
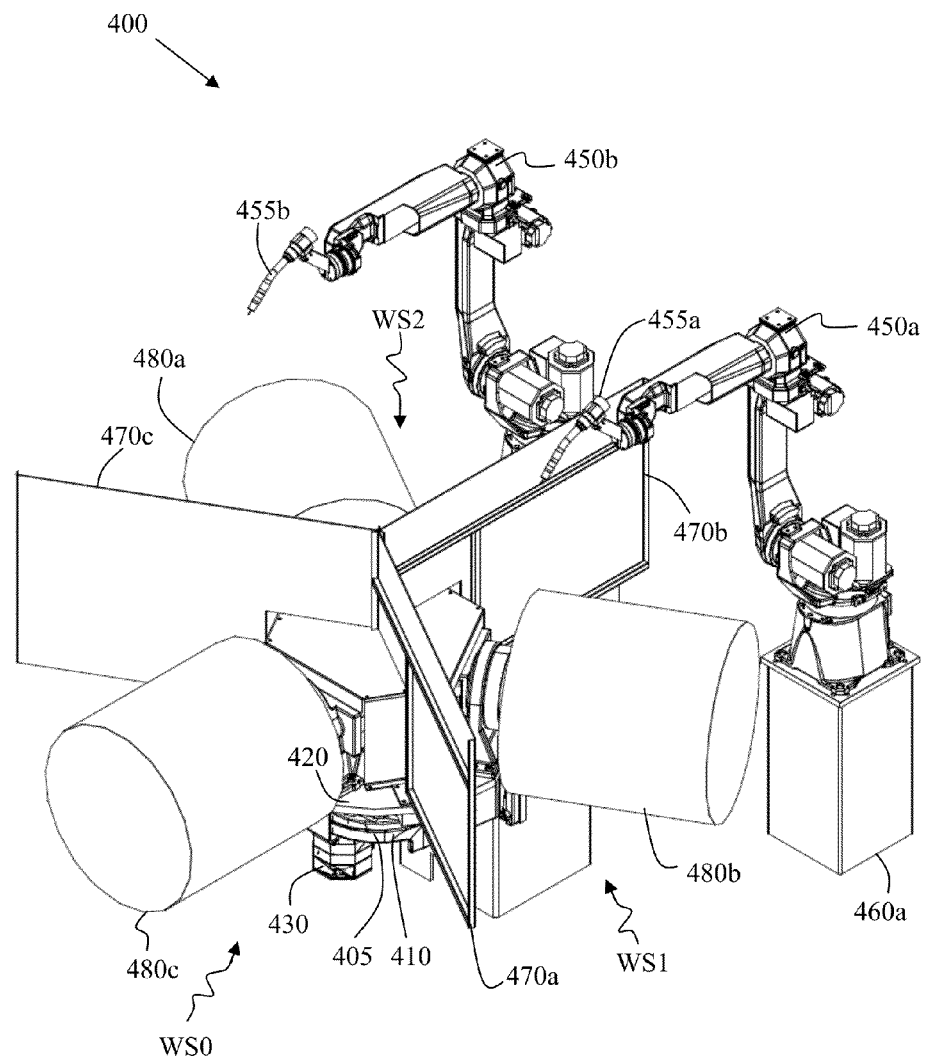
FIGS. 4 illustrates a perspective view of one embodiment of a robotic welding station including one embodiment of a multiple axis positioner.
Figure 5:
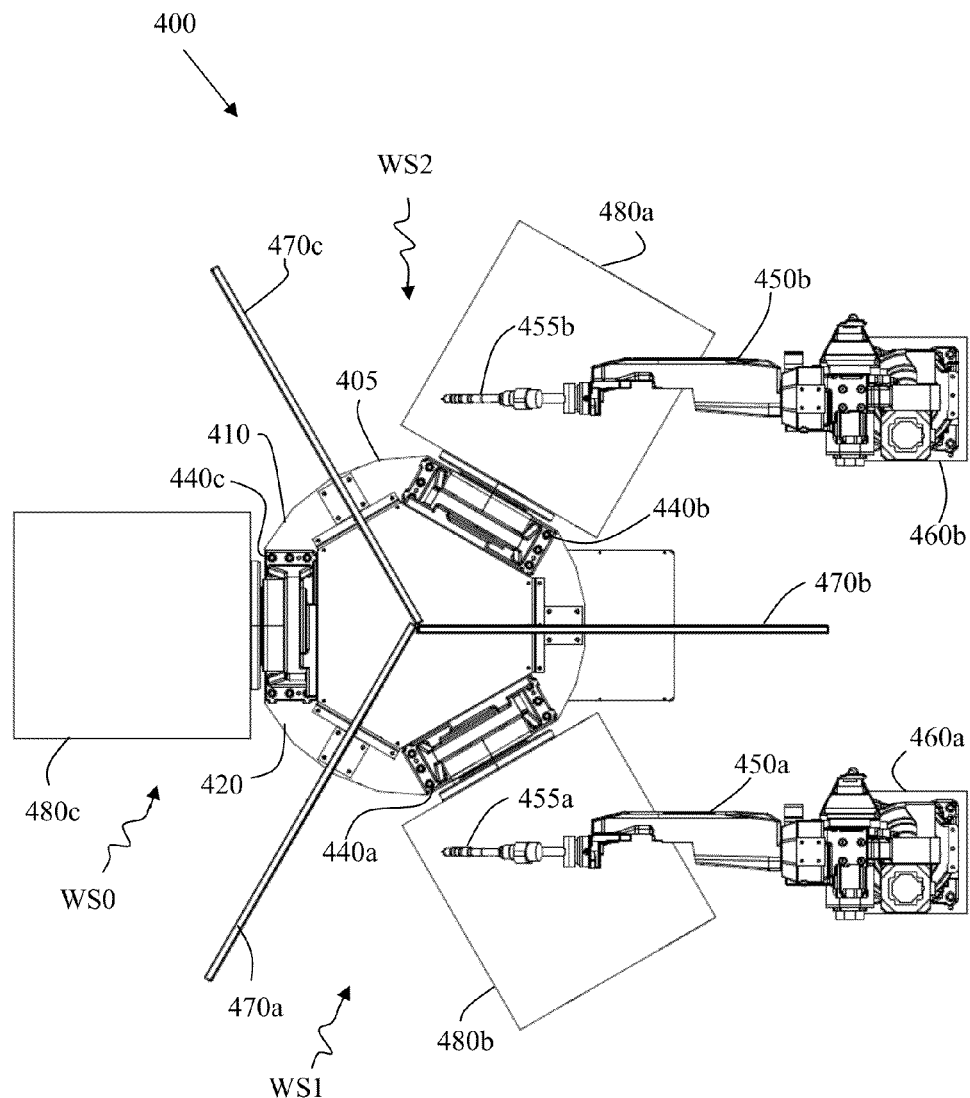
FIGS. 5 illustrates a top view of the one embodiment of the robotic welding station including the multiple axis positioner.

FIGS. 4 and 5, illustrate a perspective view and a top view, respectively, of an embodiment of a robotic welding station 400 including a multiple axis positioner 405. In the illustrated embodiment, the positioner 405 includes a main hollow bore headstock 410 and a main indexing table 420. The main indexing table 420 includes a center surface forming a main through-hole (not shown) on the main indexing table 420. The main through-hole 420 aligns or is substantially coaxial with the hollow bore of the main hollow bore headstock 410. The main hollow bore headstock 410 includes a main motor 430. In this embodiment, the main motor 430 is positioned such that it does not obstruct the main through-hole of the main indexing table 420 or the hollow bore of the main hollow bore headstock 410.

In the illustrated embodiment, the positioner 405 also includes three minor hollow bore headstocks 440a-c. Each of the minor hollow bore headstocks 440a-c is operatively connected to the main indexing table 420. The minor hollow bore headstocks 440a-c include minor motors (not shown). The minor motors are located at an off-center position in reference to the minor hollow bore headstocks' hollow bores such that the hollow bores are substantially unobstructed by the minor motors. In the illustrated embodiment, the three minor hollow bore headstocks 440a-c are located at substantially the same distance from each other on the main indexing table 420 such that the central axes of the headstocks 440a-c are located at substantially 120 degree increments around the main indexing table 420. Alternative embodiments may include more or less than three minor headstocks, and minor headstocks located at positions other than 120 degree increments.

In an alternative embodiment (not shown), the main hollow bore headstock 410 includes a main motor that has a hollow shaft. In such an embodiment, the main motor's hollow shaft is substantially aligned or substantially coaxial with the main through-hole. The main through-hole is unobstructed although the main motor is centered with respect to the main through-hole.

In another alternative embodiment (not shown), the minor hollow bore headstocks 440a-c include minor motors that have hollow shafts. In such an embodiment, the minor motors' hollow shafts are substantially aligned or substantially coaxial with the respective hollow bores of the minor hollow bore headstocks 440a-c. The hollow bores of the minor hollow bore headstocks 440a-c are unobstructed even though the minor motors are centered with respect to the hollow bores.

In the illustrated embodiment, the robotic welding station 400 also includes robot arms 450a-b carrying welding torches 455a-b. The robot arms 450a-b are mounted to platforms 460a-b. The robotic welding station 400 also includes shields 470a-c arranged between three workstations WS0, WS1, and WS2 for shielding and protecting areas outside each workstation during performance of operations such as welding, hard facing, and so on.

In the illustrated embodiment, the minor headstocks 440a-c carry workpieces 480a-c. Individual components of the workpieces 480a-c are loaded on to fixtures (not shown) at an operator's workstation WS0 prior to welding and are held in place by holding devices (not shown). Robot arm 450a may perform a first operation on the workpieces 480a-c in workstation WS1, and robot arm 450b may perform a second operation on the workpieces 480a-c in workstation WS2. In the embodiment, the indexing table 420 rotates in a counter-clockwise direction to index the workpieces 480a-c from workstation WS0 to workstation WS1 to workstation WS2. Alternatively, indexing table 420 may rotate in a clockwise direction to index the workpieces 480a-c from workstation WS0 to workstation WS2 to workstation WS1.

FIGS. 4 and 5 illustrate the robotic welding station after all of the workpieces 480a-c have been loaded on to the positioner 405. The process may begin by an operator loading a first workpiece 480a to a first fixture (not shown) located in the operator's work station WS0. Once the workpiece 480a has been loaded, the indexing table 420 indexes the first fixture 120 degrees counter-clockwise to locate the first workpiece 480a in the first workstation WS1 for robot arm 450a to perform a first operation on the first workpiece 480a. In an alternative embodiment, the fixture may be indexed clockwise instead. While the robot arm 450a performs a first operation on the first workpiece 480a, the operator may load a second workpiece 480b to a second fixture located in the operator workstation WS0.

Once the robot arm 450a has completed the first operation on the first workpiece 480a and the operator has loaded the second workpiece 480b, the indexing table 420 indexes the first fixture and the second fixture 120 degrees counter-clockwise to locate the first workpiece 480a in the second work station WS2 and the second workpiece 480b in the first work station WS1. While the robot arm 450b performs a second operation on the first workpiece 480a and the robot arm 450a performs the first operation on the second workpiece 480b, the operator may load a third workpiece 480c to a third fixture located in the operator workstation WS0. This is the configuration shown in FIGS. 4 and 5.

Once robot arm 450b has completed the second operation on the first workpiece 480a and robot arm 450a has completed the first operation on the second workpiece 480b and the operator has loaded the third workpiece 480c, the indexing table indexes the first fixture, the second fixture, and the third fixture 240 degrees clockwise to locate the first workpiece 480a in the operator station WS0, the second workpiece 480b in the second work station WS2, and the third workpiece 480c in the first work station WS1. While the robot arm 450b performs the second operation on the second workpiece 480b and the robot arm 450a performs the first operation on the third workpiece 480c, the operator may unload the first workpiece 480a from the first fixture located in the operator workstation WS0. The operator may continue this cycle until all workpieces have been completed.

In one embodiment, the first operation is a welding operation while the second operation is a hard facing operation. In an alternative embodiment, the first operation is a welding operation while the second operation is a non-welding operation. Various other operations may be performed in conjunction with the disclosed multiple axis positioner.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components. An "operable connection," or a connection by which entities are "operably connected," is one by which the operably connected entities or the operable connection perform its intended purpose. For example, two entities may be operably connected to each other directly or through one or more intermediate entities.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A multistation workpiece holder apparatus comprising:
   at least one primary base;
   a primary rotary table operatively connected to the at least one primary base, where the primary rotary table includes a primary center surface defining a primary through-hole located substantially at the center of the primary rotary table;
   a plurality of secondary bases, where each of the secondary bases is operatively connected to the primary rotary table;
   a plurality of secondary rotary tables, including at least a first secondary rotary table and a second secondary rotary table,
      where the first secondary rotary table includes a first secondary center surface defining a first secondary through-hole located substantially at the center of the first secondary rotary table at a first secondary axis, where the first secondary rotary table is operatively connected to a first secondary base,
      where the second secondary rotary table includes a second secondary center surface defining a second secondary through-hole located substantially at the center of the second secondary rotary table at a second secondary axis, and where the second secondary rotary table is operatively connected to a second secondary base; and
   a plurality of secondary rotary table motors including:
      a first secondary rotary table motor operatively connected to the first secondary rotary table and configured to rotate the first secondary rotary table about the first secondary axis, where the first secondary motor is disposed such that the first secondary through-hole is unobstructed by the first secondary motor, and
      a second secondary motor operatively connected to the second secondary rotary table and configured to rotate the second secondary rotary table about a second secondary axis, where the second secondary motor is disposed such that the second secondary through-hole is substantially unobstructed by the second secondary motor.

2. The multistation workpiece holder apparatus of claim 1, further comprising:
   a primary motor operatively connected to the primary rotary table and configured to rotate the primary rotary table about a primary axis substantially central to the primary rotary table.

3. The multistation workpiece holder apparatus of claim 2, where the primary motor is disposed such that the primary through-hole is substantially unobstructed by the primary motor.

4. The multistation workpiece holder apparatus of claim 1, where the plurality of secondary rotary tables further includes a third secondary rotary table having a third secondary center surface defining a third secondary through-hole located substantially at the center of the third secondary rotary table,
   where the third secondary rotary table is operatively connected to a third secondary base,
   where a third secondary motor is operatively connected to the third secondary rotary table and configured to rotate the third secondary rotary table about a third secondary axis, and
   where the third secondary motor is disposed such that the third secondary through-hole is substantially unobstructed by the third secondary motor.

5. The multistation workpiece holder apparatus of claim 4, further comprising at least three station shields operatively connected to the primary rotary table, where a first station shield is located between the first secondary base and the second secondary base, a second station shield is located between the second secondary base and the third secondary base and a third station shield is located between the third secondary base and the first secondary base.

6. The multistation workpiece holder apparatus of claim 4, further comprising a top shield operatively connected to the primary rotary table.

7. A workpiece positioner comprising:
   a rotary platform having a top surface and a center surface forming a main through-hole;
   means for holding a plurality of workpieces, where the means for holding include minor center surfaces forming minor through-holes, and where the means for holding are operatively connected to the top surface; and
   means for rotating the rotary platform about an axis of rotation perpendicular to the top surface, where the means for rotating the rotary platform are located such that the main through-hole is unobstructed.

8. The robotic welding positioner of claim 7, further comprising:
   means for rotating the means for holding the plurality of workpieces, where the means for rotating the means for holding the plurality of workpieces, where the means for holding the plurality of workpieces are located such that the minor through-holes are unobstructed.

\* \* \* \* \*